Jan. 21, 1930.　　　L. W. CHADWICK　　　1,744,030
METHOD OF PRODUCING BEARINGS AND APPARATUS THEREFOR
Filed Dec. 2, 1927　　　2 Sheets-Sheet 1

Lees W. Chadwick
INVENTOR.

BY
ATTORNEYS.

Jan. 21, 1930. L. W. CHADWICK 1,744,030
METHOD OF PRODUCING BEARINGS AND APPARATUS THEREFOR
Filed Dec. 2, 1927 2 Sheets-Sheet 2

Lees W. Chadwick
INVENTOR.
BY
ATTORNEYS.

Patented Jan. 21, 1930

1,744,030

UNITED STATES PATENT OFFICE

LEES W. CHADWICK, OF DETROIT, MICHIGAN

METHOD OF PRODUCING BEARINGS AND APPARATUS THEREFOR

Application filed December 2, 1927. Serial No. 237,214.

Bearings are ordinarily formed in parts so that they may be adjusted for wear and also to permit of the assembling of the members journaled in the bearing. Such bearings have been produced by providing them with linings, the more common method being to form the lining of a Babbitt metal, or similar material formed directly into the bearing. Bearing linings have been made in production by methods and then placed in the bearing housings. An example of the production of such bearings is shown in my Patent, #1,359,331, Nov. 16th, 1920. The present invention is designed to simplify the method of producing such bearing linings, or bushings, so that they may be produced with accuracy and with greater cheapness.

In carrying out my invention I produce, as in my prior invention, a tubular blank, and in the present instance this bank is intended to be approximately at least the ultimate thickness of the wall. After forming the tube, the tube is severed and then bent to the desired dimension. I have found that if it is attempted to bend the semi-cylindrical portion by any known method the blank takes a form in which portions at each side of the blank back somewhat from the edge are inside of a true cylindrical contour, or the extreme edges are outside of a true cylindrical contour. I have discovered that this can be obviated by applying bending pressure directly along the edges, and opposing said pressure along the portion of the blank directly adjacent to said edges, the effect being to spring or bend the edges inwardly and the intermediate portions of the sides outwardly, thus bringing the blank, or segment, to a true cylindrical contour. Features and details of the invention will appear from the specification and claims.

A preferred exemplification of the invention illustrating the method and apparatus by which it may be practiced is shown in the accompanying drawings as follows:—

Figure 1:
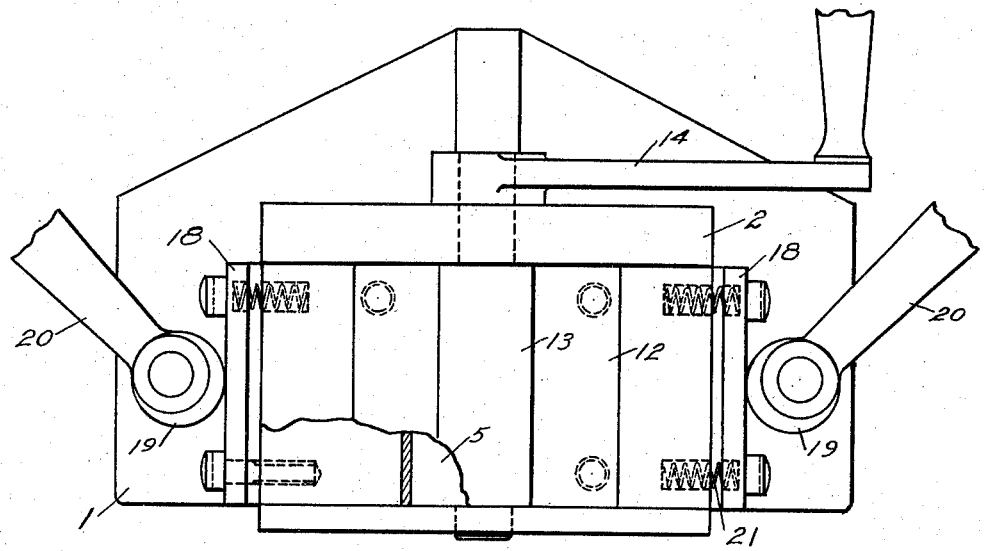

Fig. 1 shows a plan view of a press for bending a bearing segment.

Figure 2:
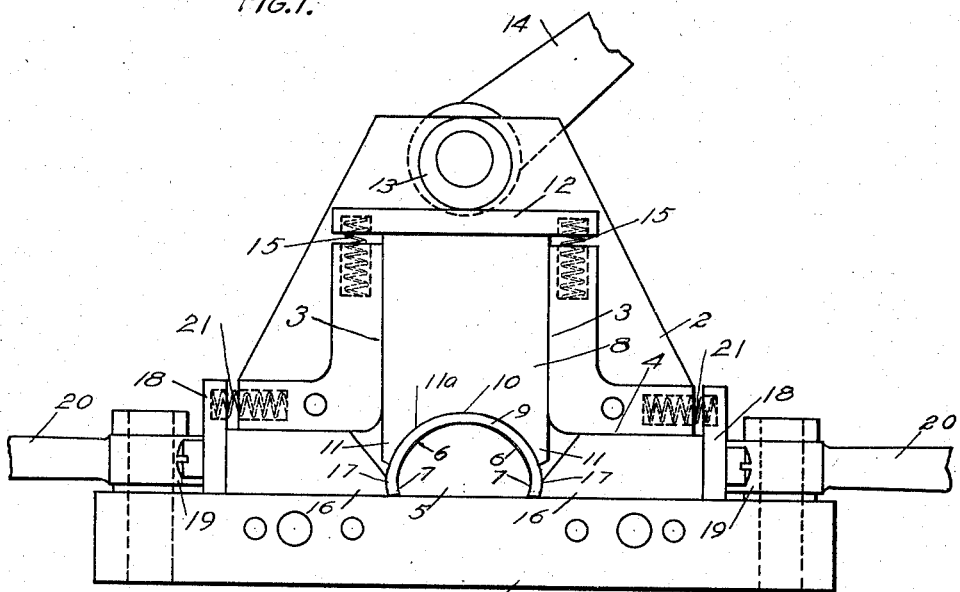

Fig. 2 a side elevation of the same.

Figure 3:
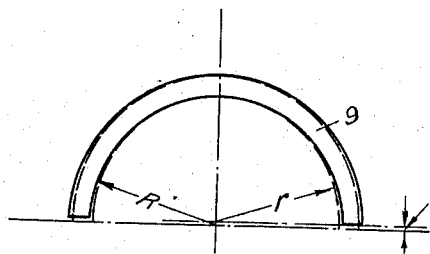

Fig. 3 a view illustrating the shape of the blank prior to bending.

Figure 4:
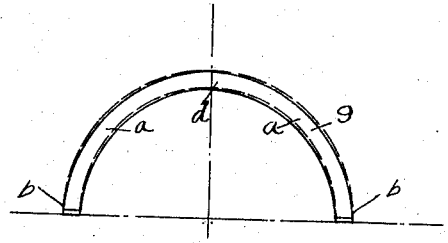

Fig. 4 a view showing the shape the blank assumes at ordinary bending.

Figure 5:
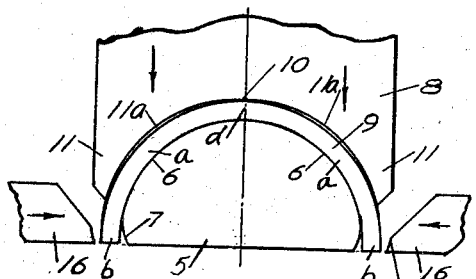

Fig. 5 a view of the blank in position in the press prior to bending.

Figure 6:
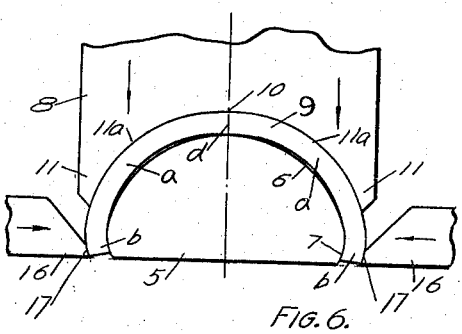

Fig. 6 a view of the blank under the stress of the bending pressure.

Figure 7:
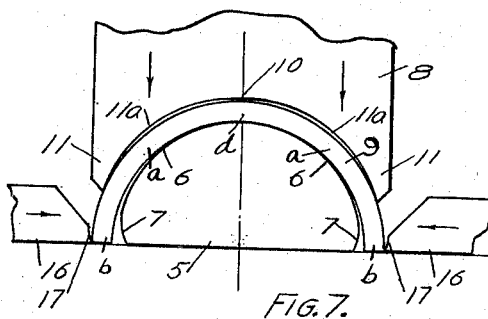

Fig. 7 the blank in the press but relieved of pressure.

Figure 8:
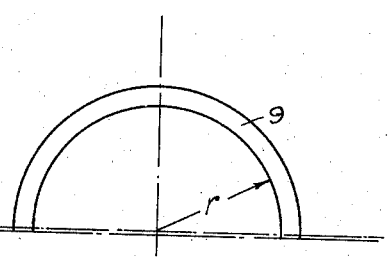

Fig. 8 the finished bearing segment.

The press follows in general the structure shown in my former patent. It comprises the base 1, the guide frame 2 mounted on the base in which there is a vertical guide 3 and horizontal guides 4.

A core 5 is mounted on the base. This core has the side cylindrical surfaces 6 smaller than the desired cylindrical surfaces and the portions at the edges cut back at 7.

A top pressure die 8 is mounted in the guide 3 and operates on a blank 9 arranged on the core. It is adapted to engage at 10 the medial part of the blank. It also has projections 11 which engage the blank at the sides of the blank adjacent to the edges. Side portions of the projections 11 at $11^a$ are outside of a cylindrical contour. A plate 12 extends across the die 8 and a cam 13 operates on the plate and is actuated by a lever 14. Springs 15 return the die after the pressing operation is completed.

Pressure jaws 16 are arranged in the guides 4 and have engaging faces 17 which in general can follow the blank to within the desired cylindrical contour when the jaws are closed, thus crowding the edges of the blank against the core at the part 6. The jaws have the plates 18 at their outer ends which are engaged by cams 19 operated by levers 20. Springs 21 return the jaws.

In Fig. 3 is shown the blank 9 after it is severed, the part $s$ indicating the portion at the edges removed in the severing operation. The original blank has a radius R. The desired blank has a smaller radius $r$ bringing the final edges of the blank at, or slightly beyond a plane through the axis of the desired segment.

In Fig. 4 is illustrated the form assumed by such a blank when bent according to any of the ordinary methods. If bent sufficiently by pressure exerted at the edges *b* the blank is flat, as it were, along the sides compared to the true circle shown in dash lines. If, however, it is attempted to have the part *a* more nearly in position the edges *b* are outside of the desired cylindrical contour but in any event the sides of the segment are flatter than the desired cylindrical contour.

Fig. 5 shows the blank placed upon the core and subjected to pressure of the die 8 bending the blank at *d* as it is ordinarily bent, the blank at *a* being within the desired contour and hugging the smaller curve of the core at 6.

Fig. 6 shows the form assumed upon the closing of the jaws 16. It will be noted that the extreme edges *b* are forced into contact with the portions 6 of the core and that the portions of the blank at "*a*" are bent outwardly outside of the cylindrical contour and into the cut-away portions 11 of the die. This outward bending of the portion "*a*" beyond, or outside of the cylindrical contour and the forcing inwardly of the extreme edges at "*b*" is carried to an extent which assures a fixed bending of the wall of the blank to bring the sides with their flattened portions "*a*" to a true cylindrical curve. The forcing inwardly of the edges *b* around the shoulder formed between the surface 6 and cut-away portion 7 also bends the blank at the part between part "*a*" and the extreme edge to the true desired cylindrical contour. The exact contour, or departure, from the desired cylindrical shape of the portions 11ª and the extent of decrease in the dimension of the surface 6 is dependent on the quality of the material, some material requiring slightly greater departure from the desired cylindrical contour than others.

In Fig. 7 is shown the blank still in the press but with the pressure relieved from the die and jaws and indicating the final position of the walls of the bearing relatively to the core and pressure surfaces.

In Fig. 8 there is shown the finished blank exactly of the desired contour having the radius *r*, the edges extending slightly beyond a half cylinder and these may be removed to exactly the plane of the axis by any desired means.

It will be understood that bearings of this type to be interchangeable and satisfactory without further operation must be very accurately made. They must have an approximately complete bearing surface on the bearing member, or shaft, journaled therein. Any variation from this reduces the capacity of the bearing under load. With the present method this may be accomplished with almost no error and may be accomplished with materials which cannot be used with any preceding methods, as for instance, steel may be used for the body of the segment carrying a facing of Babbitt metal, this structure permitting of the use of a very thin wall with great capacity for sustaining shock and load.

What I claim as new is:—

1. The method of forming bearings which consists in forming a tube, severing the tube axially, and forming a severed segment to true semi-cylindrical shape of smaller radius by pressing the edges of the segments inwardly to within the desired semi-cylindrical contour while backing a portion adjacent to the edge against such pressure at the edge.

2. The method of forming bearings which consists in forming a tube, severing the tube axially, forming a severed segment to true semi-cylindrical shape of smaller radius by pressing the edges of the segments inwardly to within the desired semi-cylindrical contour while backing a portion adjacent to the edge against such pressure at the edge, and forcing a portion of the segment at the opposite side of the backed portion to without the desired semi-cylindrical contour.

3. The method of forming bearings which consists in forming a tube, severing the tube axially, forming a severed segment to true semi-cylindrical shape of smaller radius by clamping the medial portion of the segment and pressing the edges of the segment inwardly to within the desired semi-cylindrical contour while backing a portion adjacent to the edge against such pressure at the edge.

4. The method of forming bearings which consists in forming a tube, severing the tube axially, forming a severed segment to true semi-cylindrical shape of smaller radius by bending the segment to a contour having the sides of the segment within the desired semi-cylindrical contour, then pressing the edges of the segment inwardly to within the desired semi-cylindrical contour while backing a portion adjacent to the edge against such pressure at the edge.

5. The method of forming bearings which consists in forming a tube, severing the tube axially, forming a severed segment to true semi-cylindrical shape of smaller radius by bending the segment to a contour having the sides of the segment within the desired semi-cylindrical contour, then pressing the edges of the segment inwardly to within the desired semi-cylindrical contour while backing a portion adjacent to the edge against such pressure at the edge, and forcing the portion at the opposite side of the backed portion outwardly outside of the desired semi-cylindrical contour.

6. In an apparatus for forming bearing segments, the combination of a core having surfaces supporting a superimposed segment, the core being of less radius at the edges than the desired finished radius of the segment and of less radius than other portions of the core; bending jaws exerting inwardly directed bending pressure on the edges of the segment; and mechanism actuating the jaws.

7. In an apparatus for forming bearing segments, the combination of a core having surfaces supporting a superimposed segment, the core being of less radius at the edges than the desired finished radius of the segment; means clamping the medial portion of the segment on the core; bending jaws exerting inwardly directed bending pressure on the edges of the segment; and mechanism actuating the jaws.

8. In an apparatus for forming bearing segments, the combination of a core having surfaces supporting a superimposed segment, the core being of less radius at the edges than the desired finished radius of the segment; means clamping the medial portion of the segment on the core, said means comprising bending projections operating on a portion of the segment spaced from the edges; bending jaws exerting inwardly directed bending pressure on the edges of the segment; and mechanism actuating the jaws.

9. In an apparatus for forming bearing segments, the combination of a core having surfaces supporting a superimposed segment, the core being of less radius at the edges than the desired finished radius of the segment; means clamping the medial portion of the segment on the core, said means comprising bending projections operating on a portion of the segment spaced from the edges, said projections having portions spaced from their ends of greater radii than the ends; bending jaws exerting inwardly directed bending pressure on the edges of the segment; and mechanism actuating the jaws.

10. In an apparatus for forming bearing segments, the combination of a core having surfaces supporting a superimposed segment, the core being within at its sides the desired cylindrical contour and having its edges of less radius than the desired radius of the segment; bending jaws exerting inwardly directed bending pressure on the edges of the segment; and mechanism actuating the jaws.

11. In an apparatus for forming bearing segments, the combination of a core having surfaces supporting a superimposed segment, the core being within at its sides the desired cylindrical contour and having its edges of less radius than the desired radius of the segment; means clamping the medial portion of the segment on the core; bending jaws exerting inwardly directed bending pressure on the edges of the segment; and mechanism actuating the jaws.

12. In an apparatus for forming bearing segments, the combination of a core having surfaces supporting a superimposed segment, the core being within at its sides the desired cylindrical contour and having its edges of less redius than the desired radius of the segment; means clamping the medial portion of the segment on the core, said means comprising bending projections operating on a portion of the segment spaced from the edges; bending jaws exerting inwardly directed bending pressure on the edges of the segment; and mechanism actuating the jaws.

In testimony whereof I have hereunto set my hand.

LEES W. CHADWICK.